US009495200B2

United States Patent
Ruggiero et al.

(10) Patent No.: US 9,495,200 B2
(45) Date of Patent: *Nov. 15, 2016

(54) SYSTEM FOR PARTITIONING BATCH PROCESSES

(71) Applicant: Workday, Inc., Pleasanton, CA (US)

(72) Inventors: Jonathan David Ruggiero, Walnut Creek, CA (US); Salvador Maiorano Quiroga, San Ramon, CA (US); Kevin Chan, Sacramento, CA (US); Christopher Speer, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/286,700

(22) Filed: May 23, 2014

(65) Prior Publication Data

US 2014/0373016 A1     Dec. 18, 2014

Related U.S. Application Data

(63) Continuation of application No. 13/156,278, filed on Jun. 8, 2011, now Pat. No. 8,769,537.

(51) Int. Cl.
*G06F 9/455* (2006.01)
*G06F 9/46* (2006.01)
*G06F 9/50* (2006.01)

(52) U.S. Cl.
CPC .............. *G06F 9/46* (2013.01); *G06F 9/5027* (2013.01)

(58) Field of Classification Search
None
See application file for complete search history.

(56) References Cited

U.S. PATENT DOCUMENTS

| 5,835,763 | A  | * | 11/1998 | Klein | G06F 9/4843 718/101 |
| 6,549,936 | B1 | * | 4/2003 | Hirabayashi | H04L 67/06 709/201 |
| 7,752,286 | B2 | * | 7/2010 | Anderson | G06F 17/30221 705/31 |
| 8,473,954 | B2 | * | 6/2013 | Piccazzo | G06F 9/4843 718/101 |
| 8,769,537 | B1 | * | 7/2014 | Ruggiero | G06F 9/5027 718/100 |
| 2005/0278303 | A1 | * | 12/2005 | Ruml | G06Q 10/06 |
| 2006/0048155 | A1 | * | 3/2006 | Wu | G06F 9/4843 718/101 |
| 2008/0270653 | A1 | * | 10/2008 | Balle | G06F 9/5077 710/109 |
| 2009/0217272 | A1 | * | 8/2009 | Bortnikov | G06F 9/4843 718/101 |

* cited by examiner

*Primary Examiner* — Kenneth Tang
(74) *Attorney, Agent, or Firm* — Van Pelt, Yi & James LLP

(57) ABSTRACT

A system for processing a batch job comprises a processor and a memory. The processor is configured to receive a job name for a job submitted to execute, to receive one or more job parameters, and to determine one or more nodes to run the job. The processor is configured to determine one or steps, where for each step: a step is executed on a node using a state of data associated with a start state of the step; and upon completion of executing the step, a result is stored to a durable storage. The durable storage stores the state of data associated with the start state of the step and the completion state of the step and are accessible by other execution processes as associated with either the start state of the step or the completion state of the step. The memory of the system is coupled to the processor and configured to provide processor with instructions.

21 Claims, 8 Drawing Sheets

SYSTEM FOR PARTITIONING BATCH PROCESSES

CROSS REFERENCE TO OTHER APPLICATIONS

This application is a continuation of co-pending U.S. patent application Ser. No. 13/156,278, entitled SYSTEM FOR PARTITIONING BATCH PROCESSES filed Jun. 8, 2011 which is incorporated herein by reference for all purposes.

BACKGROUND OF THE INVENTION

An enterprise database system can process large volumes of data. Performing complex business calculations on data sets representing large organizations can take a great deal of time, due to the large number of operations involved. Such jobs typically have a large number of independent operations to perform, and thus lend themselves naturally to parallelization. However, designing software for parallel computing is challenging even for experienced programmers, and errors can be very difficult to find. It is therefore difficult to adapt the parallel computing model to business computing, where new business calculations need to be designed by a business administrator, not by an experienced software designer, yet still guaranteed to work.

For a database software company providing a software as a service (SaaS) model, a further complication arises. In a SaaS architecture, a number of tenants (clients to the database software company) use shared hardware, including shared processors and shared storage. In the case of a single tenant utilizing a large parallel processor, it can utilize as much of the processor as necessary in order to complete the job as quickly as possible. However, when multiple tenants are sharing hardware, the processing power needs to be divided between the tenants in an appropriate way such that each job completes in a reasonable amount of time. Clients differ in size and requirements, complicating the division of processing power between them.

BRIEF DESCRIPTION OF THE DRAWINGS

Various embodiments of the invention are disclosed in the following detailed description and the accompanying drawings.

DETAILED DESCRIPTION

Figure 1:
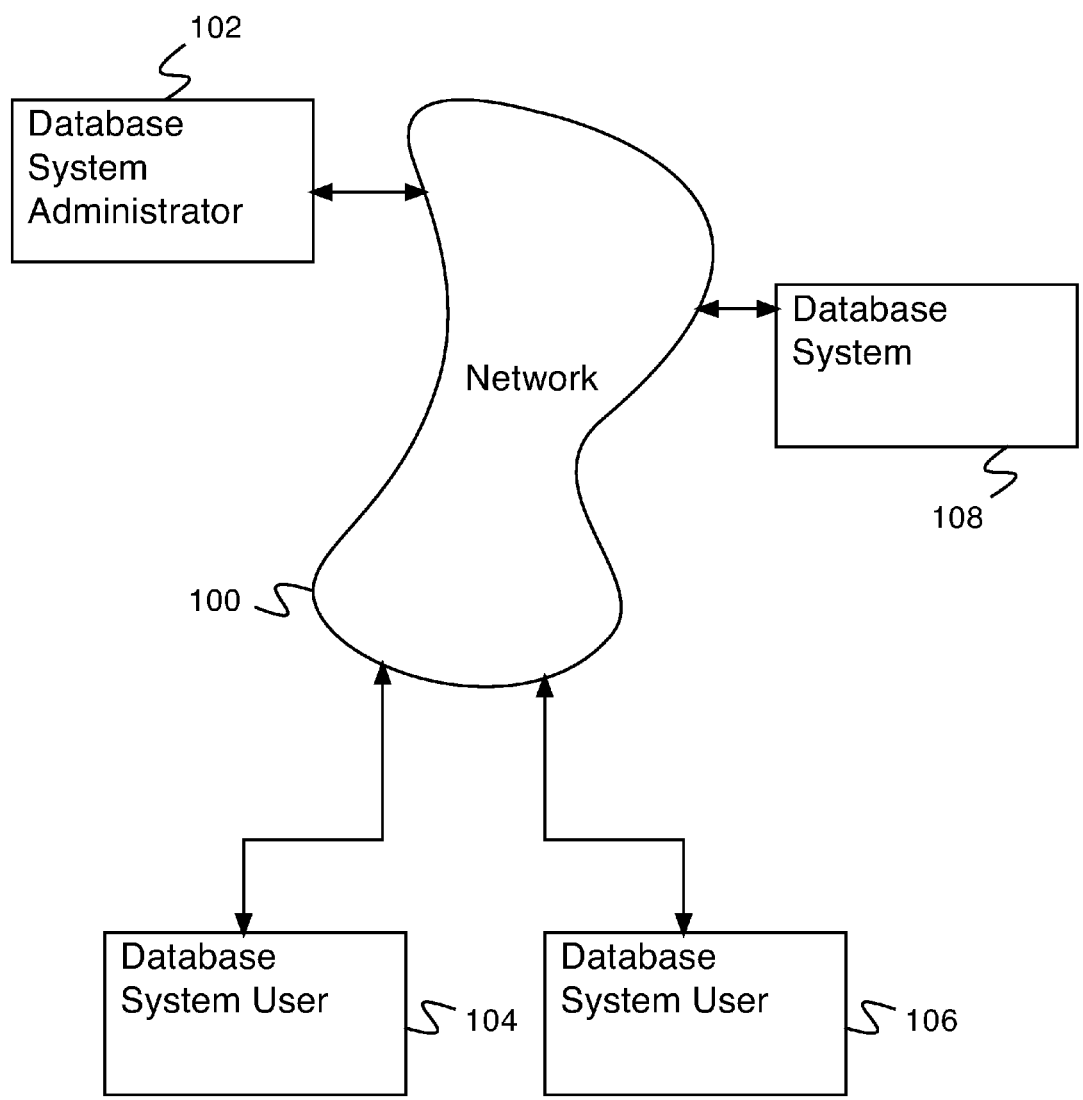
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for processing a batch job is disclosed. The system comprises a processor and a memory. The processor is configured to receive a batch job comprising a sequential or parallel flow of operations, wherein each operation has a defined input type and a defined output type. The processor is further configured to verify that the batch job can run successfully, wherein verifying includes checking that a first operation output defined type is compatible with a second operation input defined type when a first operation output is connected to a second operation input, and wherein verifying includes checking that a parameter used by a calculation in an operation is input to the operation. The memory is coupled to the processor and configured to provide the processor with instructions.

In some embodiments, the operation is performed on a set of data objects—For example, a set of employees, a set of organizations, a set of pay values, etc. In some embodiments, verifying comprises checking that the operation does not operate on a simple data type—for example, where the simple data type comprises an integer, a string, or a real number. In some embodiments, the batch job has a time bound. In some embodiments, the batch job is executed.

A system for executing a job is disclosed. The system comprises a processor and a memory. The processor is configured to receive a job name for a job submitted to execute. The processor is configured to receive one or more job parameters. The processor is configured to determine one or more nodes to run the job. The processor is configured to determine one or steps, where for each step: a step is executed on a node using a state of data associated with a start state of the step; and upon completion of executing the step, a result is stored to a durable storage. The durable storage stores the state of data associated with the start state of the step and the completion state of the step and are accessible by other execution processes as associated with either the start state of the step or the completion state of the step. For example, a process can access the state of data by requesting the data as in the state associated with a given start state of a step or a process can access the state of data by requesting the data as in the state associated with a given completion of a given step. This access of the state of data continues even after the process step is complete and the data is further processed by other steps. The memory of the system is coupled to the processor and configured to provide processor with instructions.

In various embodiments, the job name comprises an alphanumeric name, a number, a job identifier, or any other appropriate name. In various embodiments, wherein determining the one or more nodes is based on one or more of the following: a user requesting the job, a customer size, a customer service level, a priority of the job, a size of the job, a current resource availability, a current number or type of executing jobs, an overall load on the system, or any other appropriate way of determining a number of nodes. In some embodiments, executing the step comprises splitting the execution into one or more partitions. In various embodiments, the partitions have a maximum size, are executed in parallel within one node, are executed as a number of parallel threads, are executed as a number of parallel threads based in part on the number of cores, or any other appropriate characteristic and/or behavior associated with the partitions. In various embodiments, the step comprises on or more of the following: a calculation step, an update step, an aggregation step, a fork step, a join step, or any other appropriate type of step.

A system for error checking of process definitions for batch processes is disclosed. The system includes a user interface for specifying a new job, e.g., a business calculation or a business process. A user uses the system to define a sequential or parallel flow of operations to create the desired job. As the user specifies the job, the system verifies that it can run successfully and will not result in any syntactic errors. In order to ensure that the job can be parallelized for a distributed architecture in an automated manner, jobs defined through the system operate on sets of data objects, rather than on simple data types. For instance, an operation is performed on a set of employees, a set of organizations, a set of pay values, etc. Each operation takes a set of data as input and produces a set of data as output. The output of each operation is connected to the input of one or more operation. The input of each operation is connected to the output of one or more operation. The system verifies that each operation selected operates on a set of data (e.g., a set of employees, a set of employee's salaries, etc.), not on a simple data type (e.g., an integer, a string, a real number, etc.). The system additionally verifies that anywhere an operation output is connected to an operation input, the set data types the output and input that are defined are compatible.

When a user specifies a job, he additionally specifies a set of input parameters that the job requests of a job user when the job is run. For instance, a job may calculate the total budget for an organization, and take as input the organization to run on, or may calculate the number of employees under a given manager, and take as input the manager to calculate for. In order to guarantee a job can run successfully, when the job is defined, the system verifies that operations only request parameters that are defined in the specified set of input parameters. In some embodiments, the batch job has a time bound.

In some embodiments, the application developer is able to add their own validations that run at runtime to prevent the batch from running in the event that the conditions are not met. For example, the validations validate that the pay period has already been completed, or whether all time sheets have not been properly entered before payroll, etc.

In some embodiments, the application developer is able to handle events that are raised by the job runtime process. For example, the application developer can register an event handler for events such as Job Start, Job Complete Success, Job Complete Failure, Job Complete, Job Validation Failure, etc. and the event handler can be configured to handle the events with an application developer designated course of action.

A system for partitioning batch processes is disclosed. The system includes hardware and software for coordinating parallel processing of the job in a distributed, multi-tenanted architecture (e.g., an architecture in which there are more than one tenant, for example, more than one customer using the system and the tenants are kept isolated from each other both in processing and stored data). When a job defined using the user interface is executed, the operations executing on sets are executed in parallel, e.g., the operation is conducted on each member of the set independently, with a user-specified level of parallelism. A master computing device coordinates delivery of computing operations and portions of a set to slave computing devices. When the slaves have completed the operation, results are persisted in a durable storage and the status of the operation is sent back to the master so that the slave can be given a new computing task. In some embodiments, the results are delivered back to the master.

In some embodiments, a job comprises one or more steps. A step defines an operation to perform. A step is partitioned based on the data. For example, Run Payroll is a job. Step 1 is 'select pay groups to calculate.' The operation in step 1 is a method to find the pay groups. Step 2 is 'select the employees in the pay groups selected in step 1.' Step 3 is 'calculate payroll for each employee in partition sizes of X employees.' So, if there are 1000 employees, for a partition size of 100 employees, there will be 10 partitions of 100 employees each.

In some embodiments, a processor is configured to receive a job name for a job submitted to execute, receive one or more job parameters (e.g., Pay Groups, Organization, Specific Employees), determine one or more nodes to run the job (e.g., the number of nodes determined is based on the nodes allocated to the cluster of nodes, on nodes that are available—for example, not busy on other jobs, and/or the service level agreements (SLA) for the job—for example, the job is only allowed to run on 1, then 2 nodes would not be allocated), determine one or more steps (e.g., starting with the first step, then as steps are completed, additional steps that have yet to be completed will be determined and allocated; if there is enough data for a subsequent step to proceed, the node can be allocated to run that step even though all partitions for the current step have not yet been completed), for each step, execute a step on a node using a state data associated with the start state of the step. In addition, for each step, upon completion of executing the step, store a result to a durable storage wherein the durable storage. The durable storage stores a state of data associated with the completion state of the step. The state of data associated with the start state of the step and with the completion state of the step. The state data associated with the start state of the step and the completion state for the step are always accessible by other execution processes.

In some embodiments, the system comprises a processor configured to execute an algorithm. The algorithm is stored in a memory which is configured to provide the processor instructions.

The system architecture includes a large number of interchangeable slave devices available to a set of tenants. Any of the tenants may request a job at any time, thus the master cannot assign all of the slave devices to any one job. However, the large amount of resources available allows a degree of flexibility to the system, where the resources allocated to the job can be adapted based on the situation. The master coordinates a job to use an appropriate number of slave devices depending on factors including the size of the job, the priority of the job, the priority of the tenant executing the job, the load on the system, etc. For instance, a tenant may negotiate an agreement where typical jobs are conducted on three parallel slave devices, but monthly large accounting jobs are conducted on ten parallel slave devices.

FIG. 1 is a block diagram illustrating an embodiment of a network system. In the example shown, the network system comprises database system administrator 102, database system user 104, database system user 106, and database system 108, communicating via network 100. In various embodiments, network 100 comprises one or more of the following: a local area network, a wide area network, a wired network, a wireless network, the Internet, or any other appropriate network. Database system administrator accesses database system 108 to create, prepare, or configure database services. In various embodiments, database services comprise financial database services, human resources database services, business process database services, content management database services, enterprise database services, or any other appropriate database services. In some embodiments, database system 108 comprises a distributed database, e.g., a database system comprising multiple computers not necessarily in the same location. Database system user 104 and database system user 106 accesses database services on database system 108. In various embodiments, there are 1, 2, 4, 13, 22, 115, or any other appropriate number of database system users accessing database services on database system 108. In some embodiments, each database system user only has access to their own data stored on database system 108 and are able to utilize database system 108 as though they are the sole database system user. In some embodiments, software and data on database system 108 is owned and maintained by database system administrator 102 and access to database system 108 is provided to database system user 104 and database system 106 as a service. In some embodiments, a database system user (e.g., database system user 104 or database system user 106) comprises a person accessing database system 108 via a user interface, e.g., a web page. In some embodiments, a database system user comprises an automated system accessing database system 108 via a machine interface, e.g., a public application programming interface (API). In some embodiments, database system 108 comprises a system for partitioning batch processes. In some embodiments, database system 108 comprises a system for error checking of process definitions for batch processes.

Figure 2:
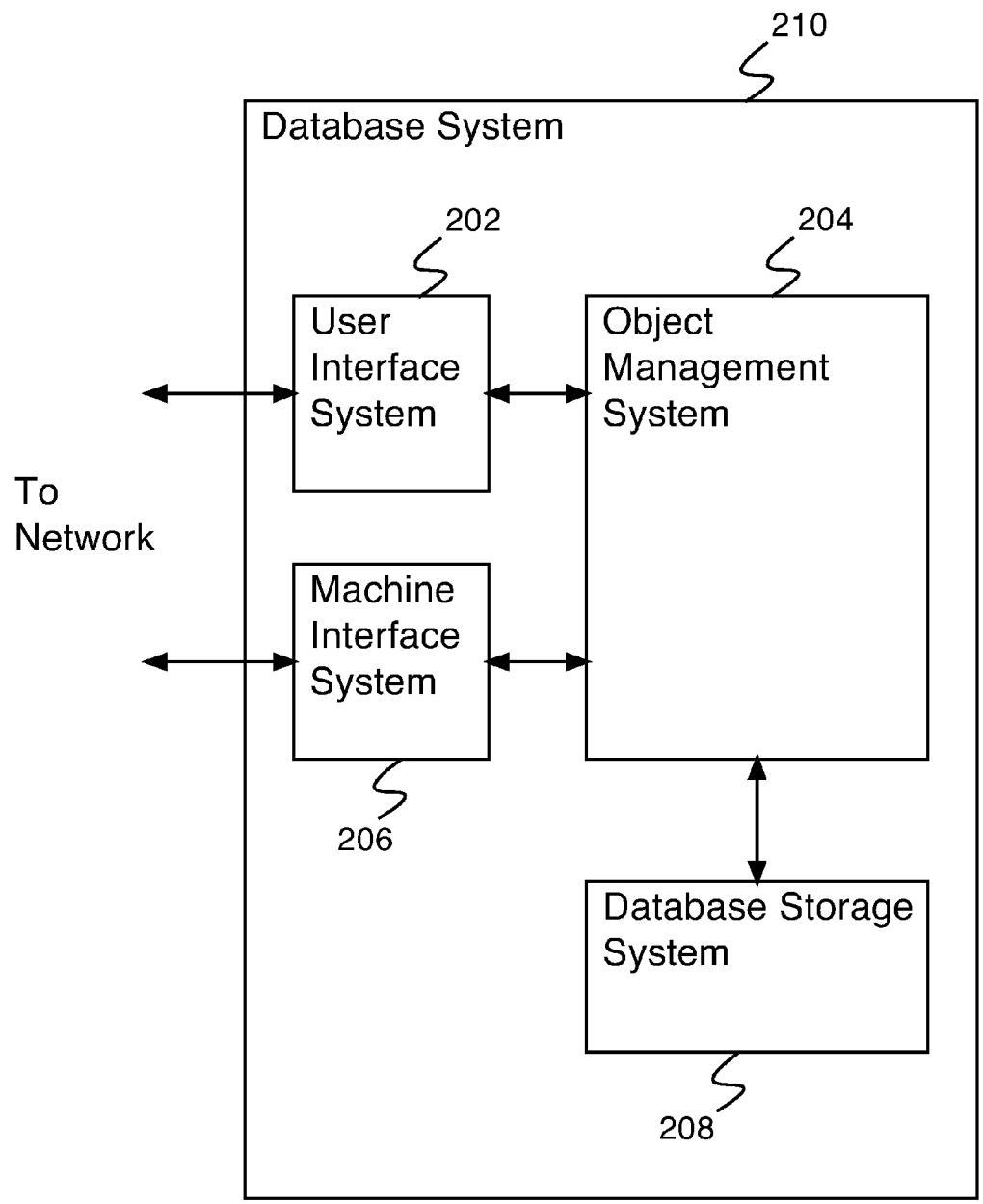
FIG. 2 is a block diagram illustrating an embodiment of a database system.

FIG. 2 is a block diagram illustrating an embodiment of a database system. In some embodiments, database system 210 comprises database system 108 of FIG. 1. In the example shown, user interface system 202 and machine interface system 206 communicate with a network, e.g., network 100 of FIG. 1. User interface system 202 comprises a system for interacting with a user over a network, e.g., a web page server. In various embodiments, a user uses user interface system 202 for querying database system 210, initiating jobs running on database system 210, modifying jobs running on database system 210, uploading data to database system 210, configuring database system 210, scheduling jobs to run at a particular time on database system 210, scheduling jobs to run at recurring intervals on database system 210, or any other appropriate use.

Machine interface system 206 comprises a system for interacting with a machine over a network, e.g., a public API. In various embodiments, a machine uses machine interface system 206 for automatically initiating jobs on database system 210, automatically receiving data to upload to database system 210, automatically providing data to download from database system 210, automatically translating the format of data, automatically processing data, or any other appropriate use. In some embodiments, database system 200 comprises more than one machine interface system 206, and executes large jobs (e.g., receiving a large amount of data to upload to database system 210) in parallel. Object management system 204 comprises a system for managing database system 210. Object management system 204 comprises software for organizing data, retrieving data, processing data, storing data, preparing reports from data, or any other appropriate function. Data is stored in database system storage 208. In some embodiments, object management system 204 and database storage system 208 comprise an object-oriented database. In some embodiments, object management system 204 and database storage system 208 comprise a distributed database.

Figure 3:
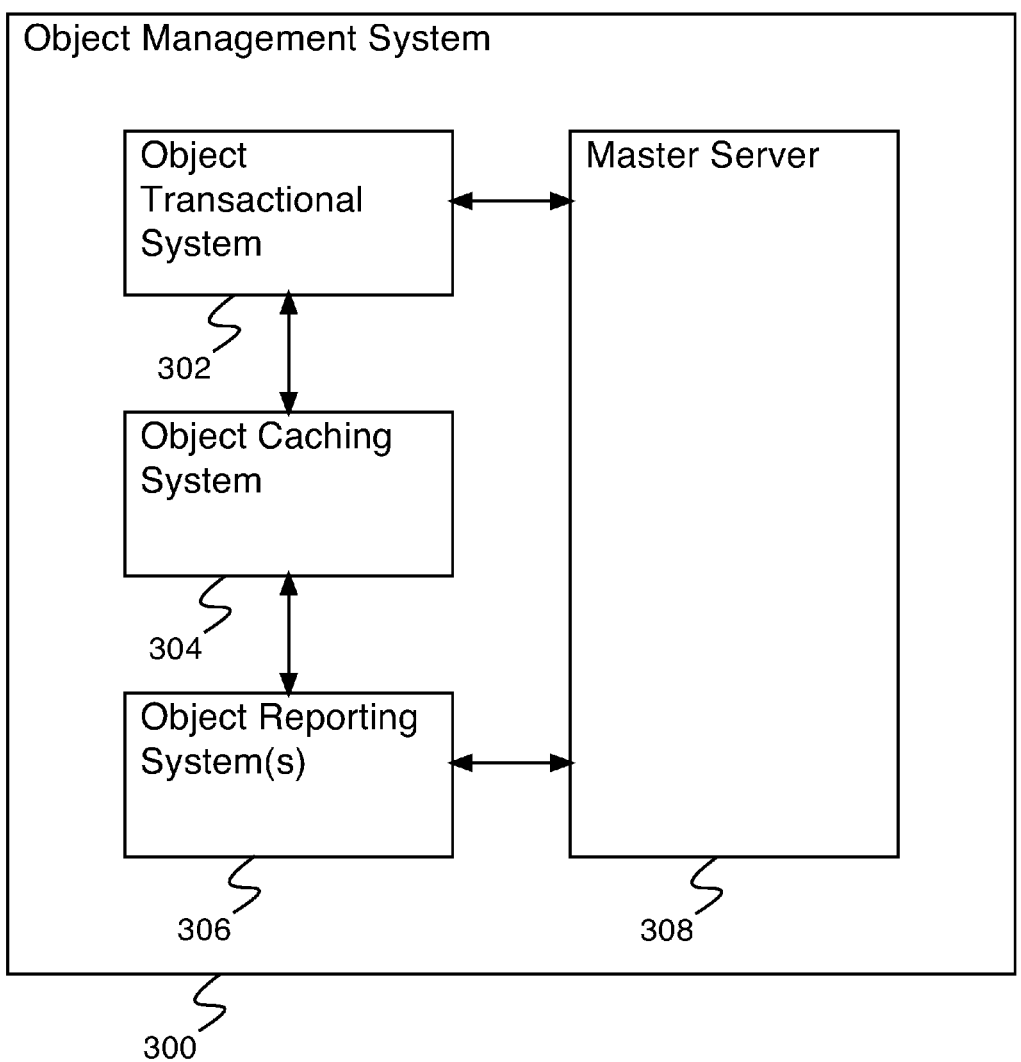
FIG. 3 is a block diagram illustrating an embodiment of an object management system.

FIG. 3 is a block diagram illustrating an embodiment of an object management system. In some embodiment, object management system 300 comprises object management system 204 of FIG. 2. In the example shown, object management system 300 (e.g., OMS) comprises object transactional system 302, object caching system 304, one or more object reporting system(s) 306, and master server 308. Object transactional system 302 comprises a system for interacting with a database storage system, e.g., database storage system 208 of FIG. 2. In various embodiments, object transactional system 302 is used for reading data from a database storage system, writing data to a database storage system, updating data on a database storage system, or any other appropriate function. In some embodiments, object transactional system 302 additionally comprises a system for creating jobs. Object transactional system 302 receives a command to start a job (e.g., from user interface system 202 of FIG. 2 or from machine interface system 206 of FIG. 2) and creates the job according to the command. Object transactional system 302 then delivers the job to master server 308. In some embodiments, object transactional system 302 breaks a job into a parent job and sub jobs and delivers the parent job and sub jobs to master server 308. In some embodiments, sub jobs comprise individual steps of a job. In some embodiments, object caching system 304 comprises a distributed caching system. In some embodiments, object caching system 304 is one of a plurality of object caching systems.

The one or more object reporting system(s) 306 comprise systems for processing data. In some embodiments, the one or more object reporting system(s) 306 comprise systems for preparing reports based on data. In some embodiments, the one or more object reporting system(s) 306 comprise general-purpose computing devices performing data processing for the object management system. In some embodiments, the one or more object reporting system(s) 306 are able to process data in parallel. Data processing in the one or more object reporting system(s) 306 is read-only, transactions that involve writing to the database storage system are conducted by object transactional system 302. In various embodiments, a database system user (e.g., database system user 104 of FIG. 1 or database system user 106 of FIG. 1) is allocated a certain number of object reporting systems 306 based on the size of the database needed by the user, the data processing needs of the user, the agreement negotiated by the user, or any other appropriate determination. In some embodiments, a database user is allocated a flexible number of object reporting systems 306, where the number is able to change based on the needs of the user.

Object caching system 304 comprises a caching system for storing data by object transactional system 302 and the one or more object reporting system(s) 306. In some embodiments, object caching system 302 is used for efficient storage and recovery of data. In some embodiments, object caching system 302 additionally comprises search index data and can provide searching of cached data. Master server 308 comprises a master server for coordinating jobs. In some embodiments, master server 308 delivers jobs or sub jobs to one or more object reporting system(s) 306. In some embodiments, master server 308 coordinates parallel processing. In various embodiments, master server 308 tracks the progress of a job, tracks the number of object reporting system(s) 306 that are processing a job, manage that all tasks delegated to object reporting system(s) 306 are completed properly, controls restarting jobs in the event of failure, or any other appropriate job coordination task. In some embodiments, master server 308 coordinates parallel processing on a plurality of machine interface systems (e.g., machine interface system 206 of FIG. 2).

Figure 4:
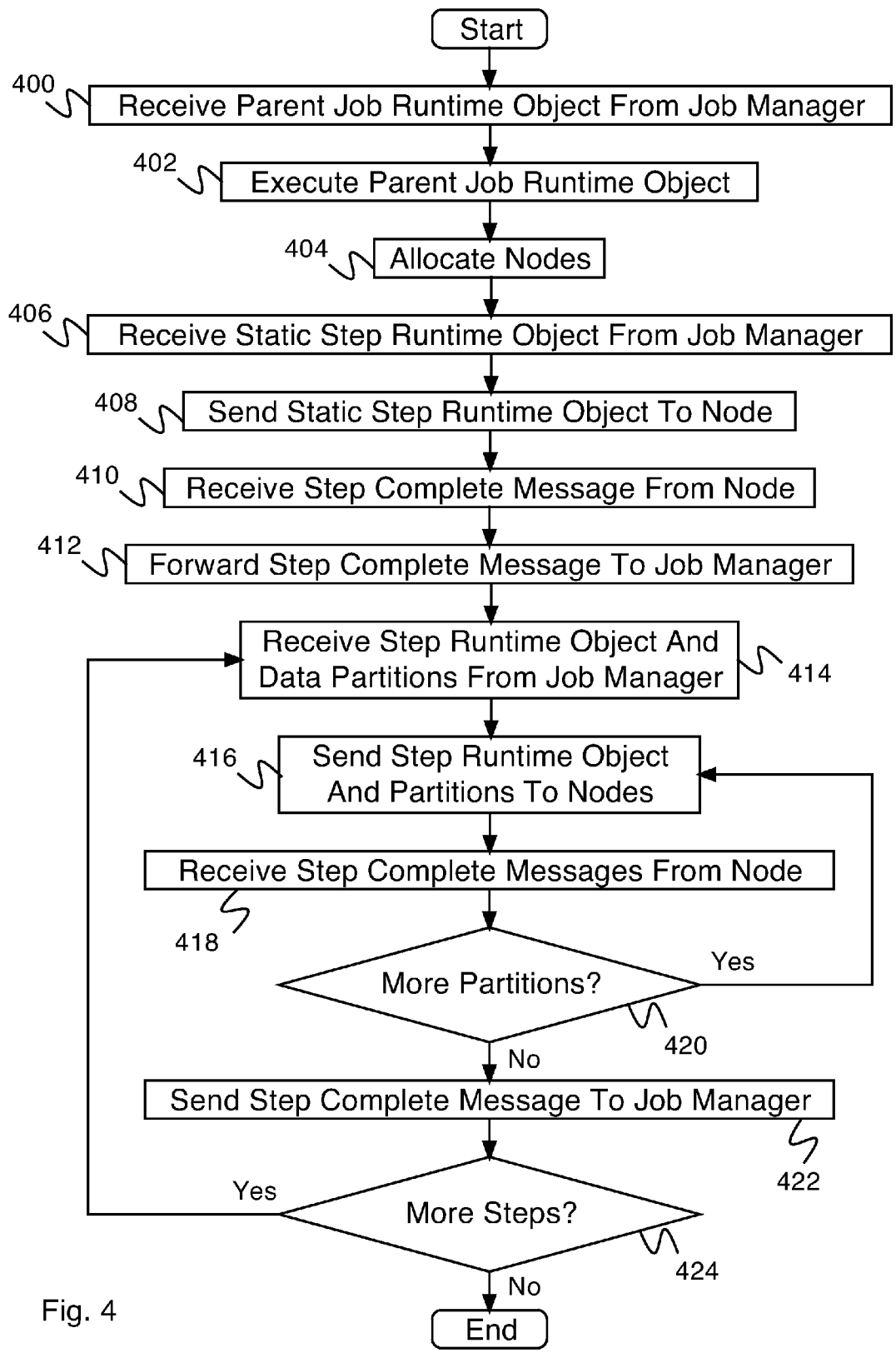
FIG. 4 is a flow diagram illustrating an embodiment of a process for executing a job.

FIG. 4 is a flow diagram illustrating an embodiment of a process for executing a job. In some embodiments, the process of FIG. 4 is executed by a master server (e.g., master server 308 of FIG. 3). In the example shown, in 400, a parent job runtime object is received from a job manager. In some embodiments, a job manager comprises an object transactional system (e.g., object transactional system 302 of FIG. 3). In some embodiments, the parent job runtime object comprises instructions for the master server for coordinating job execution. In some embodiments, the parent job is received from the job manager in response to a job request made by a user (e.g., database system user 104 of FIG. 1 or database system user 106 of FIG. 1) via a user interface system (e.g., user interface system 202 of FIG. 2) or a machine interface system (e.g., machine interface system 206 of FIG. 2). In 402, the parent job runtime object is executed. In some embodiments, executing the parent job runtime object comprises coordinating job execution.

When the parent job runtime object is executed, the job entry moment is determined. The job entry moment corresponds to the change ID (e.g., change identifier) in the database system storage (e.g., database system storage 208 of FIG. 2) at the time the parent job runtime object is executed. Whenever a method queries stored data during job processing, it queries it relative to the job entry moment. If further changes to the database occur, they are disregarded by the job. Some job steps update the database (e.g., job steps of type update or UPDT). When a job step updates the database, the job entry moment is updated to the change ID in the database system storage corresponding to the database update.

In 404, nodes are allocated. In some embodiments, nodes comprise object reporting systems (e.g., one or more object reporting system(s) 306 of FIG. 3). In some embodiments, nodes comprise machine interface systems (e.g., machine interface system 206 of FIG. 2). In some embodiments, nodes comprise object transactional systems (e.g., object transactional system 302 of FIG. 3). In some embodiments, allocating nodes comprises reserving nodes for the job being executed. In various embodiments, the number of nodes allocated depends on the user requesting the job, on the priority of the job, on the size of the job, on the overall load on the system, or on any other appropriate determining factor. In some embodiments, a user requesting a job can additionally specify that the job be run on a single node. In 406, the static step runtime object is received from the job manager. In some embodiments, the static step runtime object comprises instructions for the first step of the job. The static step is executed with input from the job runtime parameters as specified by the user scheduling/requesting the job. The job manager coordinates parallelization of a job by assigning partitions of its input set to different nodes. Since the static step is executed without any input, it is not easily parallelizable, and thus is executed on only a single node. In 408, the static step runtime object is sent to a node.

In 410, a step complete message is received from a node, indicating completion of the static step by the node. The output of the static step is a set of objects or data, which have been stored by the node as they were calculated. In some embodiments, the output objects or data are stored in a caching system (e.g., object caching system 304 of FIG. 3) as they are calculated. In some embodiments, the output objects or data are stored in a non-volatile memory as they are calculated, so they can be recovered in the event of device or network failure. In some embodiments the output objects are stored in a durable database system. In 412, the step complete message is forwarded to the job manager. In 414, the next step runtime object and data partitions are received from the job manager. In some embodiments, a data partition is a subset of the stored data set output from the previous step. In some embodiments, a data partition has a predetermined size (e.g., number of elements of the data set output) for each step. In some embodiments, the data partition size can change automatically. In some embodiments, if the data set output from the previous step does not divide evenly into partitions of the predetermined partition size, as many partitions of the predetermined partition size as possible are formed, and a final smaller partition is formed with the remaining data. For example, partitions are based on the size of the data—1000 employees with a partition size of 100 will result in 10 partitions of 100 each. However, different job steps may have different partition sizes based on historic observations for the optimal partition size based on performance testing, and observation of production runs of the job.

In 416, the step runtime object and data partitions are sent to nodes. As many nodes as have been allocated in 404 each are sent the step runtime object and a data partition. In some embodiments, the step runtime object comprises instructions for executing the next step in the job. In some embodiments, executing the next step in the job comprises processing the data received in the data partition. In some embodiments, executing the next step in the job comprises storing the data received in the data partition. If the data set output from the previous step divides into a number of partitions smaller than the number of nodes allocated in 404, some of the nodes are left idle. If the data set output from the previous step divides into a number of partitions greater than the number of nodes allocated in 404, some of the partitions wait to be processed until nodes have finished processing the first partition they receive. In some embodiments, the node processes multiple elements of the partition received in parallel, e.g., if the node has 16 processors, it can process 16 elements of the partition at once. In some embodiments, if the user requesting a job has additionally specified that the job be run on a single node, the user can additionally specify that the job run sequentially on that node and only process a single element at a time.

In 418, a step complete message is received from a node, indicating completion of the step by the node. The output of the step is a set of objects or data, which have been stored by the node as they were calculated. In some embodiments, the output objects or data are stored in a caching system as they are calculated. In some embodiments, the output objects or data are stored in a non-volatile memory as they are calculated, so they can be recovered in the event of device or network failure. In some embodiments, after a set of objects is calculated, the set is checked to verify that it does not contain any repeated objects. Any repeated elements found are eliminated. In some embodiments, when a node completes processing, it merges its set of objects or data with the set of objects or data calculated by the other nodes processing partitions from the same input data set. In some embodiments, when a set of new objects calculated by a node is merged with a set objects previously calculated by other nodes processing partitions from the same input data set, the set of new objects is checked to verify that it does not contain any objects already written to the previously calculated set. Any repeated elements found are eliminated. In 420, it is determined whether there are more partitions to process in the current step. If there are more partitions to process in the current step (e.g., there are more partitions than nodes allocated), control passes to 416, and processing of the partitions continues. If there are no more partitions to process, the step is complete. In 422, the step complete message is sent to the job manager. In 424, it is determined if there are more steps in the current job. If there are more steps in the current job, control passes to 414. If there are no more steps in the current job, the process ends.

Figure 5:
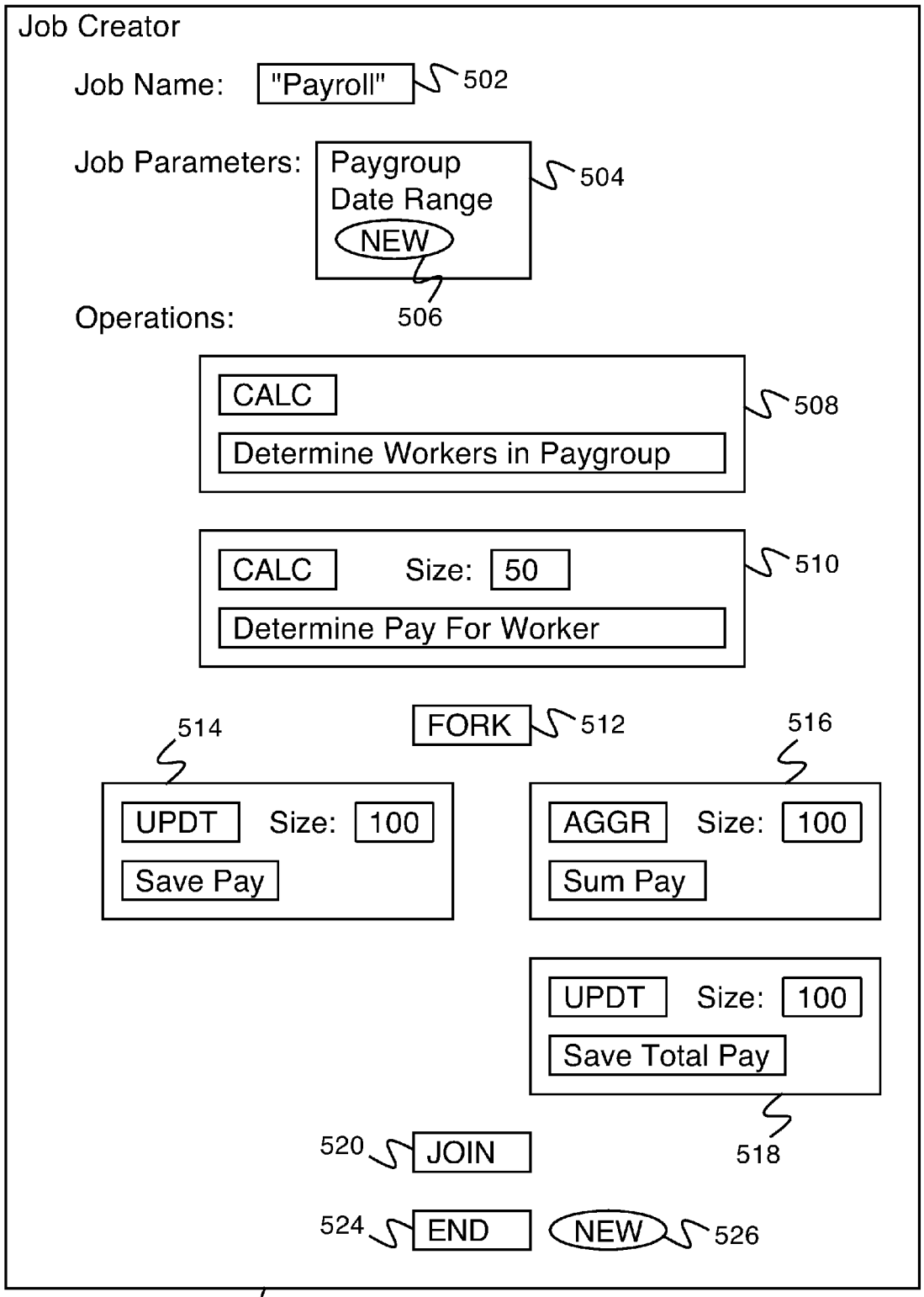
FIG. 5 is a diagram illustrating an embodiment of a job creation user interface.

FIG. 5 is a diagram illustrating an embodiment of a job creation user interface. In some embodiments, the job creation user interface of FIG. 5 is provided by a user interface system (e.g., user interface system 202 of FIG. 2) to a database system user (e.g., database system user 104 of FIG. 1 or database system user 106 of FIG. 1). In the example shown, job creator 500 allows a user to indicate a job name, job parameters, and a set of operations. A user can indicate a name for the job using job name box 502. A user can indicate a set of parameters for the job using job parameters box 504. New parameters can be entered using new button 506. Parameters comprise variables that a job user is prompted for when the job is run, and operations have access to when the job is running. If an operation requests a value of a parameter that is not defined using job parameters box 504, job creator 500 will report an error.

Operation box 508 comprises an operation type box and a method box. In the example shown, the operation type selected is CALC (e.g., a calculation) and the method selected is "Determine Workers in Paygroup". A calculate operation performs a method on each member of the input set and produces an output set. Operation box 508 corresponds to the first operation in the job, therefore operation box 508 corresponds to the static step and takes no input. When the operation indicated in operation box 508 is executed, the "Determine Workers in Paygroup" method is executed by a single node, and creates an output set according to the method. Operation box 510 comprises an operation type box, a method box, and a partition size box. In the example shown, the operation type selected is CALC, the method selected is "Determine Pay For Worker", and the partition size is 50. The "Determine Pay For Worker method operates on each of the output set produced by the "Determine Workers in Paygroup" method of operation box 508, producing an output set of pay values. The operation is processed by one or more nodes, depending on the number of nodes allocated to the job (e.g., the number of nodes allocated in 404 of FIG. 4) and the number of objects in the set output by the operation indicated by operation box 508. The one or more nodes process the operation in parallel.

Operation box 512 comprises an operation type box indicating a FORK operation. No additional information is required for a FORK operation. A FORK operation indicates that the job splits into two paths that are executed in parallel. Operation box 514 comprises an operation type box, a method box, and a partition size box. In the example shown, the operation type selected is UPDT. An UPDT operation comprises an operation that updates the database storage (e.g., database storage system 208 of FIG. 2). In some embodiments, UPDT operations are executed by an object transactional system (e.g., object transactional system 302 of FIG. 3). In some embodiments, UPDT operations are executed by more than one object transactional system in parallel. The output set from an UPDT operation is an empty set. The method selected is "Save Pay". In the example shown, the "Save Pay" method persists the pay values input to it. Operation box 516 comprises an operation type box, a method box, and a partition size box. In the example shown, the operation type box comprises an AGGR operation (e.g., an aggregation operation). An AGGR operation performs a function to aggregate values in the input set. In the example shown, the "Sum Pay" method is selected. In the example shown, the "Sum Pay" method sums the pay values in the input set and produces an output set comprising one element, the total pay value. Operation box 518 comprises an operation type box, a method box, and a partition size box. In the example shown, the operation type selected is UPDT, and the method selected is "Save Total Pay". The "Save Total Pay" method persists the total pay value in the set input to it.

Operation box 520 comprises an operation type box indicating a JOIN operation. A JOIN operation joins two paths split by a FORK operation. In some embodiments, the JOIN operation merges the output sets from the final operations of the two paths split by the FORK operation. In some embodiments, the JOIN operation forces job processing to wait for all processing of both paths to complete before finishing. End box 520 indicates that the job ends. New step button 526 allows a user to create a new operation to extend the job.

Figure 6:
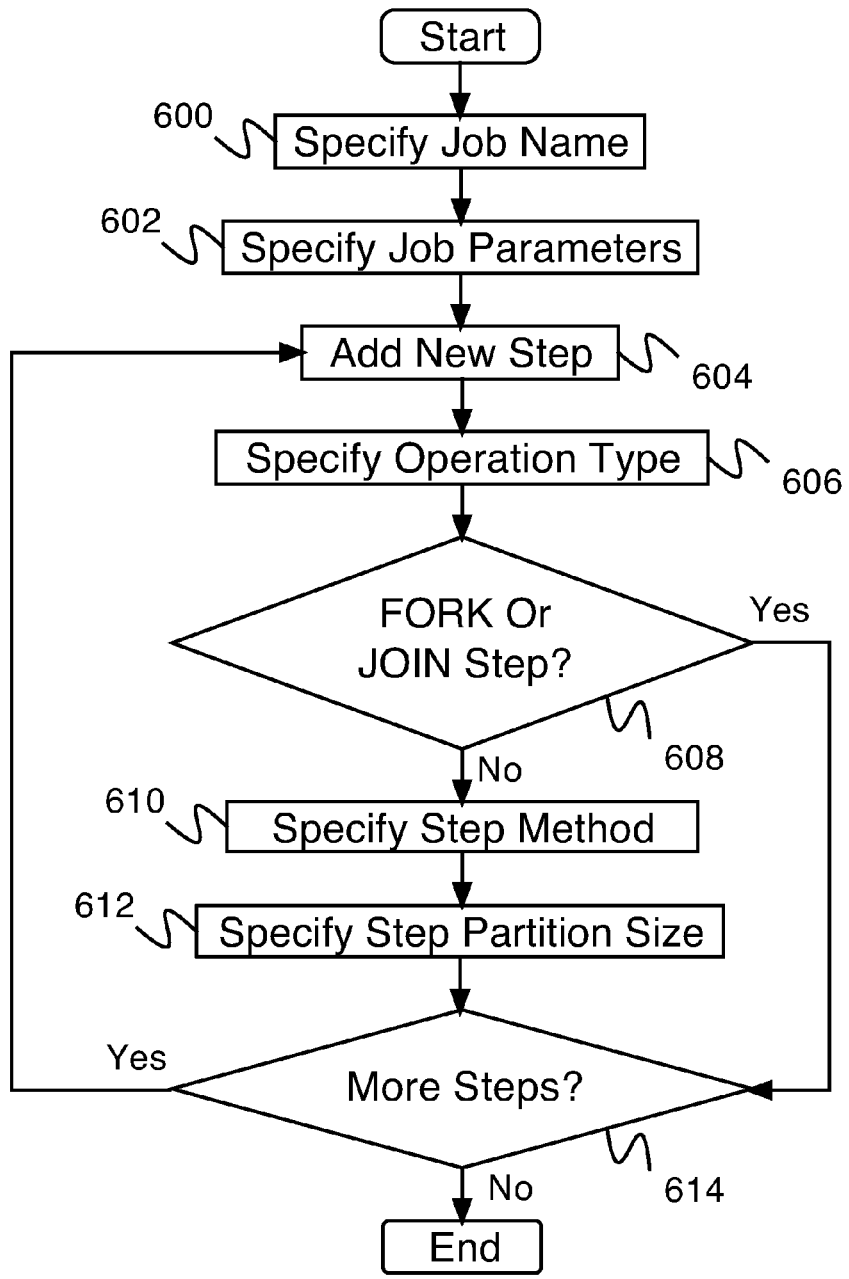
FIG. 6 is a flow diagram illustrating an embodiment of a process for creating a job.

FIG. 6 is a flow diagram illustrating an embodiment of a process for creating a job. In some embodiments, the process of FIG. 6 is executed by a database system user (e.g., database system user 104 of FIG. 1 or database system user 106 of FIG. 1) interacting with a job creator (e.g., job creator 500 of FIG. 5). In the example shown, in 600, the job name is specified (e.g., in job name box 502 of FIG. 5). In 602, the job parameters are specified (e.g., in job parameters box 504 of FIG. 5). In 604, a new step is added to the job (e.g., with new step button 526 of FIG. 5). In 606, the operation type is specified (e.g., in an operation type box). In 608, it is determined if the step operation type is a FORK or a JOIN step. If the operation type is a FORK or a JOIN step, control passes to 614. If the operation type is not a FORK or a JOIN step, control passes to 610. In 610, the step method is specified (e.g., in a method box). In 612, the step partition size is specified (e.g., in a partition size box). In 614 it is determined if more steps are desired to be added to the job. If it is determined that more steps are desired to be added to the job, control passes to 604. If it is determined that more steps are not desired to be added to the job, the process ends.

Figure 7:
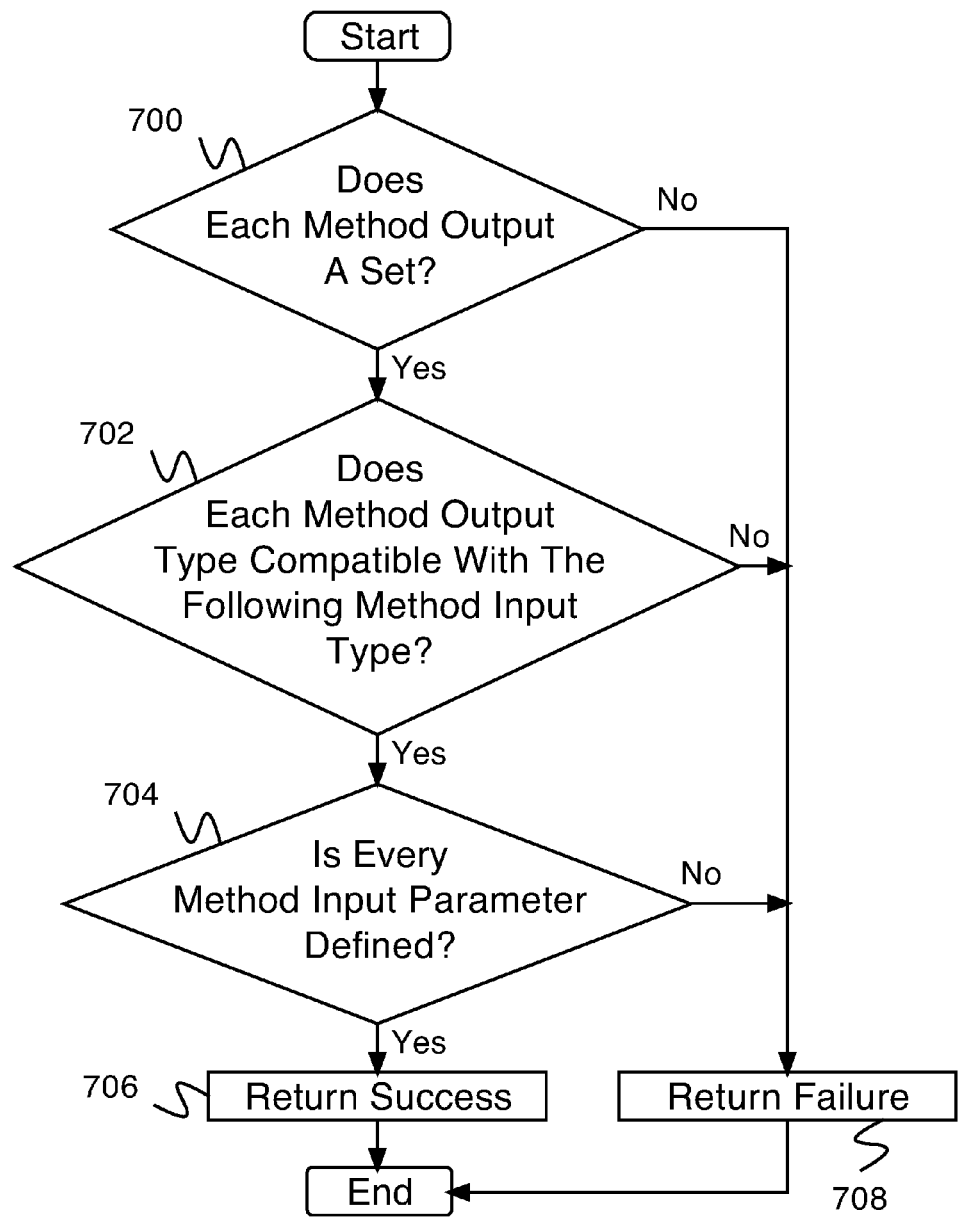
FIG. 7 is a flow diagram illustrating an embodiment of a process for verifying a job.

FIG. 7 is a flow diagram illustrating an embodiment of a process for verifying a job. In some embodiments, the process of FIG. 7 is executed by a job creator (e.g., job creator 500 of FIG. 5). In various embodiments, the process of FIG. 7 is executed when a job creation process (e.g., the process of FIG. 6) is completed, when the process of adding a new step to a job is complete, or at any other appropriate interval. In the example shown, in 700 it is determined whether each method outputs a set. In some embodiments, determining whether each method outputs a set comprises determining the method selected for each operation in the job that requires a method (e.g., each CALC, UPDT, and AGGR operation), querying the method for its output type, and determining whether the output type is a set. If it is determined that each method outputs a set, control passes to 702. If it is determined that the job includes a method that does not output a set, control passes to 708. In 702, it is determined whether each method output type is compatible with the following method input type. In some embodiments, determining whether each method output type is compatible with the following method input type comprises determining the method selected for each operation in the job that requires a method (e.g., each CALC, UPDT, and AGGR operation), querying the method for its input and output type, and comparing the output type of each method with the input type of the method in the following operation. In some embodiments, the methods must match exactly. In some embodiments, there exist one or more type hierarchies, and a method may receive as input objects of type lower in a type hierarchy from what it is designed to receive. For example, if object types employee and consultant both descend from object type worker, a method expecting a set of object type worker can receive a set of object type employee without causing any errors. If it is determined in 702 that each method output type is compatible with the following method input type, control passes to 704. If it is determined in 702 that the job includes an operation with a method output type that is not compatible with the following method input type, control passes to 708.

In 704, it is determined whether every method input parameter is defined. In some embodiments, determining whether every method input parameter is defined comprises determining the method selected for each operation in the job that requires a method (e.g., each CALC, UPDT, and AGGR operation), querying the method for its input parameters, and checking that those input parameters are defined (e.g., in step 602 of FIG. 6). If it is determined that every method input parameter is defined, control passes to 706. If it is determined that the job includes a method with an input parameter that is not defined, control passes to 708. In 706, the process returns success, and ends. The process returning success indicates that the job is allowed to run. In 708, the process returns failure, and ends. The process returning failure indicates that the job is not allowed to run.

In some embodiments, the system disclosed is used for batch processing of payments—for example, payroll payments. Enterprise systems process large volumes of data. At some point the volume of data causes the processing time to go beyond a point where it is reasonable for a human to wait for the process to complete. These processes are then structured in a manner to allow for offline or background processing. This requires various job management and job monitoring facilities that allow business users to start jobs and receive notifications upon completion. Although the jobs no longer need to be monitored by a human, background processing does not solve the processing time issue. Users no longer have to be present for a job to complete, but the job runtime can still increase as data volumes grow. Most business processes are time-bound by real-world business situations (e.g., fiscal period end, pay period close, enrollment period end, etc) so running the job in the background is not sufficient, it must run within a bound time window as well. A common solution for reducing the runtime is to introduce distributed processing of the job, and parallelization of the work. However distributed computing and parallel computing is difficult for even the most senior programmers. Moving to a distributed or parallel model introduces bugs that can be difficult to find, and behavior that can be difficult to understand. Thus, the application developer's job becomes more difficult.

In some embodiments, a distributed runtime architecture can be difficult to design, monitor, and maintain. Historically this type of architecture was intended to run programs for a single customer or tenant. Service providers that host solutions for many customers typically replicate entire technology stacks for each customer. Replicating a distributed computing architecture would quickly become unmanageable. A system is disclosed that provides a job definition language and runtime framework that allows an application developer to focus on the business logic of the job, and not focus on the runtime distribution or parallelization of the work. The definition framework and runtime system provide a set of consistent rules and runtime guards that make it impossible for the application developer to create concurrency issues, and in which the job runtime automatically manages distribution of the jobs and handles failure scenarios. Furthermore, the definitional language requires no coding in a text-based grammar as is common with many programming languages. Programmers can only add and modify nodes in a syntax tree that provides guarantees that the program is correctly defined. The runtime handles job and tenant level isolation and physical (e.g., hardware) resource management across multiple jobs of different types for different customers. This may include customers of different sizes, customers with different job service level agreements, etc. all running on a common distributed architecture. For example, a service level agreement states that payroll for Customer A must finish in under 1 hour whereas another service level agreement states that payroll for Customer B must finish in under 2 hours, where Customer A may have, for example, paid a higher premium for a higher level of service.

In some embodiments, a job definition consists of an ordered sequence of one or more job steps. At runtime each step runs on the context calculated from the previous step—essentially creating a "for each" loop on the elements of the context set. The first step is a special step in that there is no context is available, so this step needs to run in a "static" context. Generally this step performs a query type operation to produce the first context set. For example, a simple job may be defined as:

1. Calculate the set of organizations in United States Business Sites
2. For each organization, calculate the set of workers in the hourly pay group
3. For each worker calculate hours worked for the month of January, and calculate Pay
4. For each worker pay amount, persist the data
5. Complete In the above job, step one has no context, so the calculation needs to be defined as a static query against the data in the system. Step 2 has the context of a set of organization objects or instances, so the calculation step will be defined assuming an organization. Step 3 has a context of Worker, and so on.

The job definition language can guarantee that each step is correctly defined in such a way that the calculation context is correct. For example, an application developer would see an error message if the calculation in step 2 was defined to accept a worker context rather than an organization. This avoids common runtime application programming errors by catching invalid logic at design time.

Note that in the example Job above, the first two steps result in sets of instances (e.g., objects) that are persisted business entities. The calculation of these steps would typically consist of various filter operations applied to an input set. However, the third step is a set of instances (e.g., objects) that represent some derived or computed data based on the persisted data. In this example the job immediately persists this computation, but the computed instances could also be used as input for a subsequent calculation step.

In some embodiments, application developers can also specify a set of input parameters that are required for the Job. For example, a payroll job may be defined by an application developer to require a business site or a pay group as input to the process. So in the above example job definition the "United States Business Sites" can be parameterized as "Input Business Site" that is provided at runtime either by a human operator initiating the process or by a scheduled job definition.

The job definition language allows an application developer to choose one of the following job step types:

Calculation
  Application developer specifies a method (e.g., business logic) that will return a set of instances (e.g., objects). The method must be defined on the appropriate class based on the input context, or if no context is available (e.g., in the case of the first step) the method can be static. At runtime, the result set becomes the context set for the next step. The instances can either be instances that represent the objects in the system (e.g., organizations, workers, etc) typically through filtering & traversal operations, or a set of "derived" instances that represent a calculation result on each instance in the context set. The instances in the result set are of a common data type (e.g., Worker). Methods are defined in the XpressO language—a domain language specific to Workday applications that require no text-based coding. The methods are the same methods that are used in other parts of the Workday application.

Aggregation
  Application developer specifies method(s) on the context class that will produce measures along with an aggregation type (e.g., sum, maximum, minimum, count) as well as grouping operators. The resulting set is then used as context for the next step.

Update
  The application developer specifies a method that will persist data. Non-static update methods must be defined on the appropriate class based on the input context resulting in a "for each" update loop. Update methods could also be static for cases where no context set is expected. At runtime the result of an update step resets the context for the next step to empty set.

Fork
  The application developer specifies two branches of job definition. The branches are further composed of job steps. All branches of the fork will have the same input context set. A fork branch may terminate in an update step or a calculation step.

Join
  The application developer specifies a join point or barrier that indicates that the job runtime should wait for all branches in a prior fork to complete. If the branches of a fork terminate in update steps, the context at the join will be an empty set. If the branches of a fork terminate in a calculation step the context sets can be merged if they are of a common type. If the context sets cannot be merged because of incompatible types a design-time error will be provided to the application developer. Additionally, a Join step cannot be specified without a preceding fork step as this too would be a design-time error.

In some embodiments, as different jobs may run more efficiently with different partition sizes, the application developer can specify the partition size for each of the steps at the step level. The partition size governs the maximum number of instances (objects) that will be processed in a single partition (e.g., sent to each node at runtime). For example, if there are 1000 members of a set, and the partition size for the step is 100, there will be 10 partitions of 100 members. In the above job through testing or through historical observations of prior runs we may observe that the second step performs optimally at a partition size of 100, but the third at a partition size of 50. In addition to performance considerations, the partition size determines the granularity at which a job may checkpoint progress and restart in the case of a runtime failure.

In some embodiments, the following types of jobs are defined:
  Payroll calculation—distribute a set of workers, for each calculate pay, aggregate all the results
  Report calculation—given a set of instances of a given type, distribute the instances, perform filter operations, execute field value calculations, aggregate, sort, and produce the results
  Other business batch processing (e.g., financial allocation, period close, benefits enrollment completion, mass transactions across workers, etc.)
  Search/Analytic index computation—given a set of instances, distribute the instances, compute search terms, denormalized views of the instance, and index the results To allow for jobs to be run with or without human control there are various job scheduling options available to end users (e.g., business administrators):
  Run Now—The job will be executed immediately
  Run at a scheduled time—The job will be run at a scheduled time, or on some recurrence interval (e.g., daily, weekly, bi-weekly, monthly, etc.)

Additionally the scheduling framework allows for runtime parameters to be specified to the job based on the parameters specified by the application developer in the job definition. The scheduling framework can audit that all required parameters are supplied, and show an error to the end user if they are missing. For example in the simple job the "Business Site" parameter would be required. Optionally, special time-specific parameters can also be supplied to the scheduling input to restrict the data visible to the runtime job. This is known as "entry moment" specification. This means that only data that was entered in the system as of the point in time will be visible to the execution of the process. This is possible due to the job runtime that guarantees an isolated & consistent view of data at a fixed point in time throughout the execution of a job.

In some embodiments, job runtime execution comprises the following: a job manager determines the job to be run, interprets the job definition, and manages execution of the steps. The job manager then starts execution by creating a "runtime" object to manage the state of the job, and the state of each step. Since the job definition is deterministic we can compute all the steps that will need to be executed and pre-create the runtime objects for each step. The job manager then executes the steps in the defined order generally following this logic:

- if there is an input context set, partition the set into sub sets given the partition size for the job step
- for each partition, submit a request to the job executor including the partition elements to process, and any input parameters supplied at runtime
- if there is no input context set, and the step is static, submit the job step to the job executor
- if there is no input context set, and the step is non-static, there is no work to be done In some embodiments, the first determination to be made is the type of execution a particular instance of a job will take. There are 3 options:

- Single Node Sequential—Execute the job in a single node in sequentially. This is useful for application developers testing jobs.
- Single Node Parallel—Execute the job in a single node in parallel. This is useful for production environments where the job is determined to be small enough to run in a single node.
- Distributed—Execute the job across a cluster of nodes in parallel. This is useful for production environments of large jobs. This allows for additional hardware to be allocated to jobs as they grow larger.

In the single node executors, the job step runtime will generally be executed on the same node (i.e., "self execution") where the job execution started. In the distributed execution, each job step runtime is submitted to a master node. The master node is responsible for:

- Allocating 1 or more nodes for a job runtime for a tenant.
  - Allocation may take into account customer size, customer service level (e.g., bronze, silver, gold, platinum), current resource (e.g., server) availability, current number or type of executing jobs, or an overall load on the system, etc. For example, at platinum service level payroll a small customer may be allocated 2 processing nodes, a large customer allocated 5, etc.
- Start a node for one and only one tenant (e.g., customer), and load tenant state from a database, or from a caching service
- Submit job step partitions to one or more nodes
- Ensuring job steps run to completion, retrying steps if necessary,
- Handling node failures, and re-allocating job steps if necessary
- Tearing down nodes, collecting log files In some embodiments, given the example job above, the execution sequence is as follows:

- the job manager starts the job, creates a Job Runtime object, and marks the runtime "in progress"
- send a "start job runtime request" to the job executor (i.e., to self if self execution, or to the job master node if distributed). The job runtime represents the "parent" job.
- the job master allocates nodes as necessary based on job type, SLA, etc.
- the Job manager creates a Job Step Runtime object for each step in the process.
- send the "calculate set of organizations" step to the Job executor. This is the static execution step, so does not have context, and requires no partitioning.
- job master sends the step to a runtime node.
- The runtime node executes the calculation. For each instance the calculation writes down a unique ID of the instance (e.g., in the case of persisted instances), or the computed instance (e.g., in the case of calculated instances). Ensure set property is maintained. For example, a mathematical set of instances is maintained. Where there is one and only one of each instance. If there are multiple partitions that each calculate the same instance, that instance is only processed once in the subsequent steps. Repeated elements are eliminated. Upon completion write out the results to a durable store (e.g., for recovery) and send "step complete" to the Job Manager.
- Job Manager sends a "partition request" to split the complete set of organizations of size "n" into "m" partitions of size x where m=ceiling(n/x); where size refers to the number of instances. For example the number of employees to process—so, data size.
- For each partition, send a "execute partition request" to the Job executor.
- Job executor sends partitions to each runtime node for execution to calculate workers.
- Again, calculates, maintain the set property and repeat partition and calculation steps for hours & pay calculation
- For the final step where we persist the computed hours and pay, the same process is followed with the exception that a "transactional node" is used to write out the results rather than a "computational node". For example, the final persistence step is performed by an object transactional service rather than an object reporting service.

Note that partitions are calculated for each step in the process based on the number of instances produced from the prior step and the partition size for that step. Partitions are the unit of distribution across runtime nodes.

In addition to distributing partitions across multiple runtime nodes, the partition execution is parallelized within a runtime node based on the number of threads available to the node. For example, a partition for a given step may have 50 workers in it. A single node is executing that partition and can run the computation for each worker in parallel up to the number of processing threads available. The processing threads can be configured based on the number of physical processing cores (e.g., hardware level). For example, a 16 core node may allocate 16 compute threads allowing 16 workers to be calculated concurrently within a partition.

Calculation Step

- The runtime framework provides guarantees of an isolated and consistent view of the customer data that allows us to run each instance in a set in a calculation step in parallel.
- For each instance in the partition, enqueue the instance with the calculation method and available parameters, and block awaiting the results
- Worker threads take from the queue, executing the calculation method, and returning the results
- Results for the partition are put into a set
- Store the results in a durable store Respond to the job master with job step completion message
Update Step
  For each instance in the partition, enqueue the instance with the update method and available parameters
  Worker threads take from the queue, and process the update method
  Respond to the job master with the job step completion message
Aggregation Step
  For each instance in the partition, aggregate the measures based on the aggregation type (sum, maximum, minimum) and grouping dimensions.
  Store a unique instance for each unique grouping combination
    If a group combination already exists (e.g., because it was computed by another partition) add the current results into the existing results based on the aggregation type (e.g., if the type is maximum, and the computed value is greater than the stored maximum replace the instance, otherwise leave the previously computed instance alone)
  Respond to the job master with job step completion message
Fork Step
  no runtime, just determines how step runtimes are created
Join Step
  no runtime, just determines that the job manager will wait at a particular step for all forked steps to complete As steps are completed, the results are written to a durable store (e.g., typically a database). This allows for job execution to pick up at any point in the process in the event of failure of any of the execution nodes, or even the master nodes. If the master node detects node failure it queries the job state to determine the job step that was running on that node, and resubmits the job step to an available node. If the master itself fails, upon restart of the master (e.g., either manually or through a watchdog process) the master can query the job state to determine which jobs are in progress and transition jobs to the next step.

In order to achieve distribution and parallelization of work without application developer input some consistency guarantees need to be put in place. When a job starts, the "view" of the data is locked at a point in time consistent with the start of the job. This ensures that all initial calculation steps see the same view of data, and they are isolated from ongoing update activity in a running system. Additionally calculation steps are not allowed to mutate data within a calculation/read step. The calculations cannot mutate the state of the system, however each calculation has its own state containing the result of the calculation, but this is local only to the individual calculation—i.e., not shared. A locked "moment" in time provides isolation in the face of ongoing system updates, and consistency for transactions running across multiple nodes. This allows us to run calculations concurrently without the need for complex locking or reasoning about concurrent execution. There are no side effects allowed in the calculation phase, so we can guarantee that the execution can be run in parallel, and do not have to synchronize resources across concurrent executions. Note that the entry moment is described as a change or transaction ID that describes a modification point including time (i.e., don't have to concern with clock skew on nodes)

Update steps are the only steps that are allowed to mutate the state of the system. Update steps generally take the result of a computation that was executed in distributed/parallel manner and persist the calculated results to the durable store. After an update step is completed, the "entry moment" view point is reset to allow for subsequent calculations to view the data persisted data of the update step. The moment remains locked for all subsequent calculation steps until another update step is encountered.

Note that forks may result in separate execution paths that result in the different paths having different view moments due to the number and order of calculation and update steps within the fork branch. At a join point the job execution will reset to a common moment based on the latest update moment of any of the fork branches. For example, suppose there are two fork paths A and B. Path A has UpdateA1→ReadA1→UpdateA2→ReadA2. Path B has UpdateB1→ReadB1. ReadA1 is guaranteed visibility of the data that has been updated by UpdateA1, but not necessarily any updated data by UpdateB1. Similarly ReadB1 is guaranteed visibility of data updated in UpdateB1, but not necessarily UpdateA1 since these are on independent fork paths. The system locks the view of the data based on the last committed transaction prior to the step—the step cannot control this visibility point.

The XpressO runtime deals with sets of instances. Instances are the unique objects in the Workday system that represent business entities. Calculations operate on mathematical sets of instances where membership in the set is determined by the unique ID assigned to each instance. That is a set will never contain two elements with the same IDs. Since calculation steps produce sets of instances we need to ensure that the result of a calculation step results in a well-defined set. This is trivial in a sequentially executing program where the set is maintained in memory a single process. However, since the set is being calculated across a set of distributed nodes, the set needs to be maintained across calculations and unique membership also needs to be ensured. For example, a calculation may produce a set of Organizations, and then for each Organization get the set of workers for the Organization. Finally pay is calculated for all workers. Since a worker may be in more than one Organization it should be ensured that each worker is only processed once. This is achieved by maintaining the set of IDs produced from each calculation step in a set that is accessible by all calculation nodes. As calculation nodes emit elements for the set they are added to this shared set, if the add succeeds then the element has not already been seen. The set can then later be partitioned by a subsequent step for processing.

Security enforced upon the submission of the job (e.g., Payroll Administrator can only submit payroll job). Enforced for each step on distributed nodes (e.g., ensure that there are user credentials supplied with the job step request and these credentials match a user and that the job was in fact submitted by the user and the job is still in process).

Figure 8:
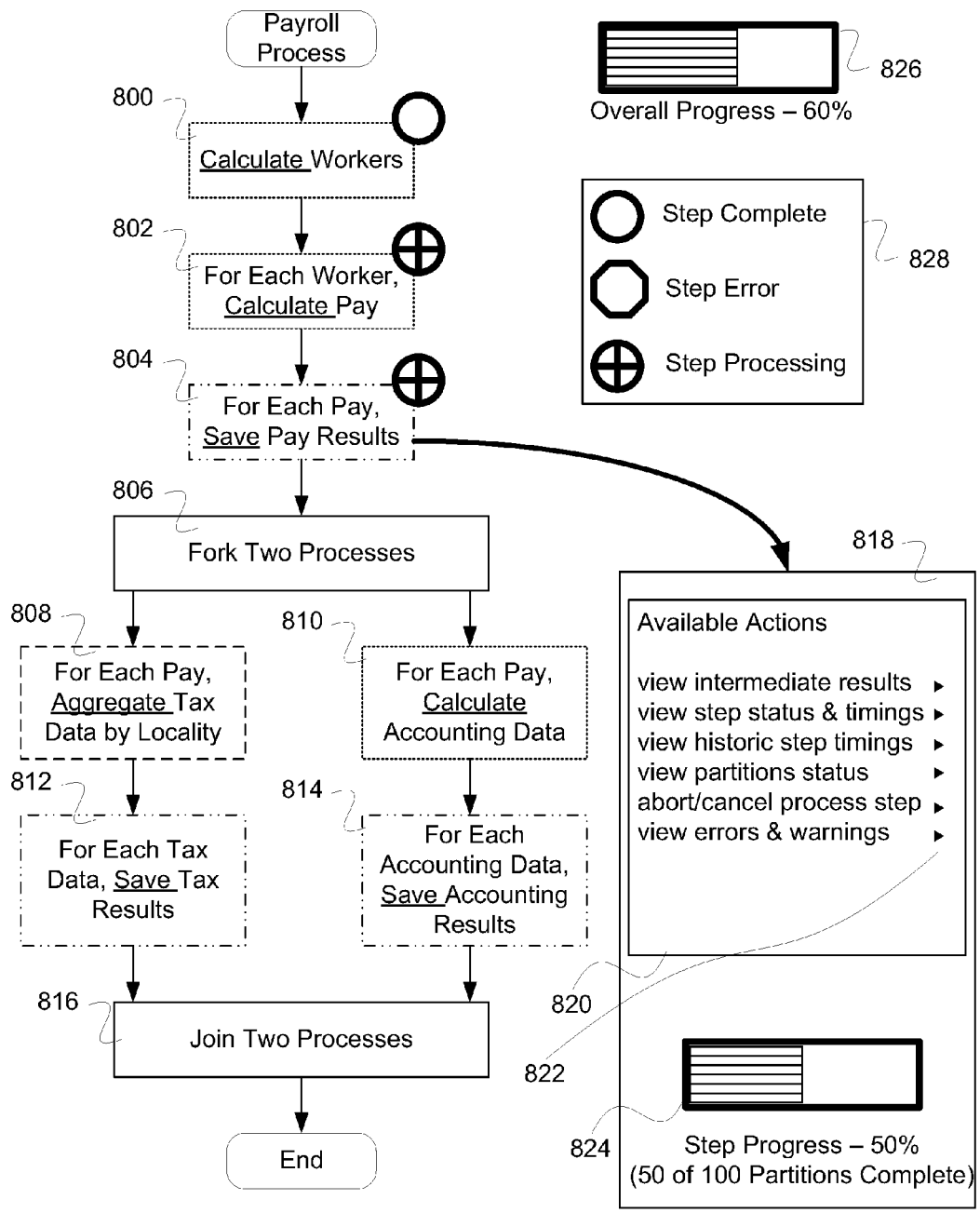
FIG. 8 is a flow diagram illustrating an embodiment of a user interface display for payroll processing.

FIG. 8 is a flow diagram illustrating an embodiment of a user interface display for payroll processing. In the example shown, a user interface displays the progress of a job. The user interface allows the end user to see the entire flow of the job, which is automatically generated from the job runtime data. The user interface allows the end user to see the steps that are in progress (e.g., there can be more than one step in progress), complete, or in error. The user interface allows the end user to see an indicator of the overall job progress (e.g., 60% overall complete—for example, progress bar 826). In 800, a calculate workers step is shown, which is indicated to be complete. Legend 828 shows three visual indicators that can be associated with steps: step complete (e.g., a circle), step error (e.g., an octagon), and step processing (e.g., circle with cross). In 800, the step is indicated to be a calculation step (e.g., a dotted box and underlined word calculate). In 802, a calculate pay step for each worker is shown, which is indicated to be processing (e.g., the circle with cross). In 802, the step is indicated to be a calculation step (e.g., a dotted box and underlined word calculate).

In 804, a save pay result for each pay is shown, which is indicated to be processing (e.g., the circle with cross). In 804, the step is indicated to be an update step (e.g., a dash-dot-dot box and underlined word save).

In 818, the progress and related information is shown associated with 804. In 818, 820 shows available actions including: view intermediate results, view step status & timings, view historic step timings, view partitions status, abort/cancel process or step, and view errors & warnings. In some embodiments, available actions relate to module related actions, favorite related actions, instance related actions, integration ID's related actions, metadata related actions, module related object related actions, OMS known instance related actions, reporting related actions, and reports related actions. In some embodiments, clicking on a triangle allows viewing details associated with an available action—for example, viewing step timings has a view start time and a view end time or for example view partition status has a view completed partitions and a view in-progress partitions. In 824, step progress is shown (e.g., 50% progress—for example, 50 of 100 partitions complete).

In 806, two processes fork (e.g., to 808 and 810). In 808, for each pay, aggregate tax data by locality is shown. In 808, the step is indicated to be an aggregation step (e.g., a dash box and underlined word aggregate). In 812, for each tax data, save tax results is shown. In 812, the step is indicated to be an update step (e.g., a dash-dot-dot box and underlined word save). In 810, for each pay, calculate accounting data is shown. In 810, the step is indicated to be a calculation step (e.g., a dotted box and underlined word calculate). In 814, for each accounting data, save accounting results is shown. In 814, the step is indicated to be an update step (e.g., a dash-dot-dot box and underlined word save). In 812 and in 814, the processes input to 816. In 816, join two processes are shown.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing a batch job, comprising:
   a processor configured to:
      receive a job name for a job submitted to execute;
      receive one or more job parameters;
      determine one or more nodes to run the job;
      determine at least two steps;
      determine a static step of the at least two steps, wherein the static step is not parallelizable by a partitioning of inputs, wherein each partition of the inputs is processed in parallel;
      execute the static step, wherein an output of the static step is a set of objects;
      determine a subset of the set of objects; and
      execute a subsequent step of the at least two steps on the subset of the set of objects on a node of the one or more nodes,
      wherein in the event two or more nodes are determined to run the job and the set of objects comprises two or more subsets, the subsequent step is executed on the two or more subsets in parallel,
      wherein a step of the at least two steps is executed using a state of data associated with a start state of the step;
      upon completion of executing the step, store a result to a durable storage, wherein the durable storage stores a state of data associated with a completion state of the step, and wherein the state of data associated with the start state of the step and the completion state of the step are accessible by other execution processes as associated with either the start state of the step or the completion state of the step;
   a memory coupled with the processor, wherein the memory is configured to provide the processor with instructions.

2. A system as in claim 1, wherein determining the one or more nodes is based on one or more of the following: a user requesting the job, a customer size, a customer service level, a priority of the job, a size of the job, a current resource availability, a current number or type of executing jobs, or an overall load on the system.

3. A system as in claim 1, wherein executing the step comprises splitting the execution into one or more partitions.

4. A system as in claim 3, wherein the one or more partitions have a maximum size.

5. A system as in claim 3, wherein the partition is executed in parallel within one node of the one or more nodes.

6. A system as in claim 5, wherein a number of parallel threads executing the partition is based at least in part on a number of physical processing cores associated with the one node of the one or more nodes.

7. A system as in claim 1, wherein the step comprises one of the following: a calculation step, an update step, an aggregation step, a fork step, or a join step.

8. A method for executing a job, comprising:
   receiving a job name for a job submitted to execute;
   receiving one or more job parameters;
   determining one or more nodes to run the job;
   determining at least two steps;
   determine a static step of the at least two steps, wherein the static step is not parallelizable by a partitioning of inputs, wherein each partition of the inputs is processed in parallel;
   executing the static step, wherein an output of the static step is a set of objects;
   determining a subset of the set of objects; and
   executing a subsequent step of the at least two steps on the subset of the set of objects on a node of the one or more nodes,
   wherein in the event two or more nodes are determined to run the job and the set of objects comprises two or more subsets, the subsequent step is executed on the two or more subsets in parallel,
   wherein a step of the at least two steps-is executed using a state of data associated with a start state of the step;
   upon completion of executing the step, storing a result to a durable storage, wherein the durable storage stores a state of data associated with a completion state of the step, and wherein the state of data associated with the start state of the step and the completion state of the step are accessible by other execution processes as associated with either the start state of the step or the completion state of the step.

9. A method as in claim 8, wherein determining the one or more nodes is based on one or more of the following: a user requesting the job, a customer size, a customer service level, a priority of the job, a size of the job, a current resource availability, a current number or type of executing jobs, or an overall load on the system.

10. A method as in claim 8, wherein executing the step comprises splitting the execution into one or more partitions.

11. A method as in claim 10, wherein the one or more partitions have a maximum size.

12. A method as in claim 10, wherein the partition is executed in parallel within one node of the one or more nodes.

13. A method as in claim 12, wherein a number of parallel threads executing the partition is based at least in part on a number of physical processing cores associated with the one node of the one or more nodes.

14. A method as in claim 8, wherein the step comprises one of the following: a calculation step, an update step, an aggregation step, a fork step, or a join step.

15. A computer program product for executing a job, the computer program product being embodied in a computer readable non-transitory medium and comprising computer instructions for:
   receiving a job name for a job submitted to execute;
   receiving one or more job parameters;
   determining one or more nodes to run the job;
   determining at least two steps;
   determine a static step of the at least two steps, wherein the static step is not parallelizable by a partitioning of inputs, wherein each partition of the inputs is processed in parallel;
   executing the static step, wherein an output of the static step is a set of objects;
   determining a subset of the set of objects; and
   executing a subsequent step of the at least two steps on the subset of the set of objects on a node of the one or more nodes,
   wherein in the event two or more nodes are determined to run the job and the set of objects comprises two or more subsets, the subsequent step is executed on the two or more subsets in parallel,
   wherein a step of the at least two steps is executed using a state of data associated with a start state of the step;
   upon completion of executing the step, storing a result to a durable storage, wherein the durable storage stores a state of data associated with a completion state of the step, and wherein the state of data associated with the start state of the step and the completion state of the step are accessible by other execution processes as associated with either the start state of the step or the completion state of the step.

16. The computer program product recited in claim 15, wherein determining the one or more nodes is based on one or more of the following: a user requesting the job, a customer size, a customer service level, a priority of the job, a size of the job, a current resource availability, a current number or type of executing jobs, or an overall load on the system.

17. The computer program product recited in claim 15, wherein executing the step comprises splitting the execution into one or more partitions.

18. The computer program product recited in claim 17, wherein the one or more partitions have a maximum size.

19. The computer program product recited in claim 17, wherein the partition is executed in parallel within one node of the one or more nodes.

20. The computer program product recited in claim 19, wherein a number of parallel threads executing the partition is based at least in part on a number of physical processing cores associated with the one node of the one or more nodes.

21. The computer program product recited in claim 15, wherein the step comprises one of the following: a calculation step, an update step, an aggregation step, a fork step, or a join step.

* * * * *